United States Patent
Hanakawa et al.

(10) Patent No.: US 10,040,033 B2
(45) Date of Patent: Aug. 7, 2018

(54) MULTILAYER SEPARATION MEMBRANE

(71) Applicant: TORAY INDUSTRIES, INC., Tokyo (JP)

(72) Inventors: Masayuki Hanakawa, Shiga (JP); Koichi Takada, Shiga (JP); Takahiro Tokuyama, Shiga (JP); Kenta Iwai, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 99 days.

(21) Appl. No.: 15/103,591

(22) PCT Filed: Nov. 27, 2014

(86) PCT No.: PCT/JP2014/081322
§ 371 (c)(1),
(2) Date: Jun. 10, 2016

(87) PCT Pub. No.: WO2015/087702
PCT Pub. Date: Jun. 18, 2015

(65) Prior Publication Data
US 2016/0310907 A1 Oct. 27, 2016

(30) Foreign Application Priority Data
Dec. 13, 2013 (JP) ................................ 2013-257756

(51) Int. Cl.
| | | |
|---|---|---|
| *B01D 39/00* | (2006.01) | |
| *B01D 29/00* | (2006.01) | |
| *B01D 29/46* | (2006.01) | |
| *B01D 69/12* | (2006.01) | |
| *B01D 69/02* | (2006.01) | |
| *C02F 1/28* | (2006.01) | |
| *C02F 1/44* | (2006.01) | |
| *B32B 27/06* | (2006.01) | |
| *B01J 20/26* | (2006.01) | |
| *B01J 20/28* | (2006.01) | |
| *B01J 20/32* | (2006.01) | |
| *B01D 67/00* | (2006.01) | |
| *B01D 69/08* | (2006.01) | |
| *C02F 101/10* | (2006.01) | |
| *C02F 101/20* | (2006.01) | |

(52) U.S. Cl.
CPC ......... *B01D 69/12* (2013.01); *B01D 67/0009* (2013.01); *B01D 67/0018* (2013.01); *B01D 69/02* (2013.01); *B01D 69/08* (2013.01); *B01J 20/261* (2013.01); *B01J 20/28038* (2013.01); *B01J 20/327* (2013.01); *B01J 20/3293* (2013.01); *B32B 27/06* (2013.01); *C02F 1/285* (2013.01); *C02F 1/44* (2013.01); *B01D 2325/02* (2013.01); *B01D 2325/04* (2013.01); *B01D 2325/12* (2013.01); *B32B 2307/724* (2013.01); *C02F 2101/108* (2013.01); *C02F 2101/20* (2013.01)

(58) Field of Classification Search
USPC ................................ 210/502.1, 490, 500.41
See application file for complete search history.

(56) References Cited

U.S. PATENT DOCUMENTS

| | | | | |
|---|---|---|---|---|
| 4,605,701 A | * | 8/1986 | Harada | ..................... C08F 8/00 |
| | | | | 525/107 |
| 4,612,122 A | * | 9/1986 | Ambrus | ................... B01J 45/00 |
| | | | | 210/638 |
| 4,927,540 A | * | 5/1990 | Wessling | ........... B01D 67/0088 |
| | | | | 210/490 |
| 5,087,372 A | | 2/1992 | Toyomoto et al. | |
| 6,447,684 B2 | * | 9/2002 | Parekh | ................... B01D 61/00 |
| | | | | 210/195.2 |
| 8,205,754 B2 | * | 6/2012 | Hanakawa | ......... B01D 67/0009 |
| | | | | 210/490 |
| 9,259,690 B2 | * | 2/2016 | Hanakawa | ......... B01D 67/0006 |
| 2005/0115890 A1 | * | 6/2005 | Demmer | ............ B01J 20/28004 |
| | | | | 210/502.1 |
| 2011/0194225 A1 | * | 8/2011 | Onishi | ..................... H01C 7/12 |
| | | | | 361/212 |
| 2013/0284664 A1 | | 10/2013 | Takagi et al. | |
| 2015/0021261 A1 | | 1/2015 | Shiotani et al. | |

(Continued)

FOREIGN PATENT DOCUMENTS

| | | |
|---|---|---|
| CN | 103338846 A | 10/2013 |
| CN | 103975005 A | 8/2014 |
| JP | 58-205543 A | 11/1983 |

(Continued)

OTHER PUBLICATIONS

Raymond David Szidon, "separation of metal ions on chelating resin", Iowa Stte University,Ames Laboratory Technical Reports, May 1961.*

Chinese Office Action issued in Chinese Application No. 201480068378.3 dated Aug. 28, 2017, together with an English translation.

Chinese Office Action and Search Report, dated Mar. 3, 2017, for Chinese Application No. 201480068378.3, as well as an English translation of the Chinese Office Action.

Fineman et al., "Letters to the Editors", John Wiley & Sons Inc., Journal of Polymer Science, 1950, vol. 5, No. 2, pp. 258-269.

Greenley, "Free Radical Copolymerization Reactivity Ratios", John Wiley & Sons Inc. (the U.S.A.), Polymer Handbook, 4th edition, 1999, pp. II/181-II/319.

(Continued)

*Primary Examiner* — Ana Fortuna
(74) *Attorney, Agent, or Firm* — Birch, Stewart, Kolasch & Birch, LLP

(57) ABSTRACT

An object of the present invention is to provide a multilayer separation membrane having excellent performance on both removal of suspended solids in water and adsorptive removal of metal ions in water. A multilayer separation membrane of the present invention includes: a porous adsorption layer including substantially a polymer having chelating functional groups; and a porous clarification layer, and the porous clarification layer is disposed neater to a raw water-side than the porous adsorption layer.

7 Claims, No Drawings

(56) References Cited

U.S. PATENT DOCUMENTS

| | | | | |
|---|---|---|---|---|
| 2015/0053610 A1* | 2/2015 | Diallo | ................ | B01D 67/0079 |
| | | | | 210/500.23 |
| 2017/0157572 A1* | 6/2017 | Iwai | ...................... | B01D 71/34 |

FOREIGN PATENT DOCUMENTS

| | | |
|---|---|---|
| JP | 3-68425 A | 3/1991 |
| JP | 3-94883 A | 4/1991 |
| JP | 4-83532 A | 3/1992 |
| JP | 5-309243 A | 11/1993 |
| JP | 7-24314 A | 1/1995 |
| JP | 2005-74378 A | 3/2005 |
| JP | 2007-160271 A | 6/2007 |
| JP | 2008-105016 A | 5/2008 |
| JP | 2010-227757 A | 10/2010 |
| JP | 2011-16116 A | 1/2011 |
| JP | 2012-161741 A | 8/2012 |
| JP | 2013-151671 A | 8/2013 |
| WO | WO 2012/105397 A1 | 8/2012 |
| WO | WO 2012/108102 A1 | 8/2012 |

OTHER PUBLICATIONS

International Search Report issued in PCT/JP2014/081322, dated Feb. 10, 2015.
Ohtsu, "Kaitei Kobunshi Gosei no Kagaku (Revised version, Chemistry of Polymer Synthesis)", Kagakudojin, 1992, pp. 111-116.
Written Opinion of the International Searching Authority issued in PCT/JP2014/081322 (PCT/ISA/237), dated Feb. 10, 2015.

* cited by examiner

MULTILAYER SEPARATION MEMBRANE

TECHNICAL FIELD

The present invention relates to a multilayer separation membrane having the capability of removing suspended matter in addition to the capability of removing specific compounds such as metal ions, which are suitable for various kinds of water treatment such as drinking water production, industrial water production, water-purification treatment, effluent treatment and seawater desalination.

BACKGROUND ART

In recent years, separation membranes have been utilized in various fields, such as a field of water treatment including water-purification treatment and effluent treatment, a field of medical uses including blood purification, a field of food industry and a field of using them as separators for batteries, charged membranes, electrolyte membranes for fuel cells and the like.

Of those fields, the field of drinking water production and the field of industrial water production in particular, namely the fields of water treatment for uses in water purification, effluent disposal and seawater desalination, have come to use separation membranes as alternatives to traditional sand filtration, coagulative sedimentation or evaporation, or for the purpose of enhancing the quality of treated water. Since the amount of treated water is great in such fields, as long as separation membranes deliver excellent water-permeation performance, it becomes possible to reduce the area of each separation membrane, whereby the apparatus can be made compact in size to result in saving on the cost of facilities, and the excellent water-permeation performance of the separation membranes also becomes advantageous in terms of membrane exchange cost and footprint of the apparatus.

As separation membranes for water treatment are used those appropriate to sizes of substances targeted for separation which are present in water to be treated. Since natural water usually contains lots of suspended solids, microfiltration membranes or ultrafiltration membranes for removal of suspended solids in water have generally been used. Depending on the water to be treated, there may be cases where water is contaminated with harmful metal ions, and these metal ions are too small in size to remove by the use of microfiltration membranes or ultrafiltration membranes. As a result, there has been a necessity to provide a step of removing metal ions in water in addition to the clarification step for removing suspended solids from the water.

On the other hand, it is known that the removal of metal ions in water have been carried out by adsorptive removal using an ion exchange resin, adsorptive removal using a chelating resin, and adsorptive removal using an inorganic adsorbent such as a cerium compound (Patent Document 1). However, these adsorptive removals have not only economic problems concerning the cost of facilities including an adsorption tower, initial investments in resins, the cost of resin regeneration and so on, but also a practical utility problem, such as clogging of a water channel due to adsorption of suspended solids in water onto adsorbents. For this reason, there has been a need to provide a step for removing suspended solids in water in addition to the adsorption step for removing metal ions.

Further, there have been known the membrane provided with an adsorption layer having chelating functional groups through graft polymerization only at the surface or in a surface layer thereof (Patent Document 2) and the membrane prepared by introducing glycidyl methacrylate onto the surface of a porous membrane and the inner surfaces of pores in the porous membrane through the graft polymerization and then chemically introducing thereto chelating functional groups (Patent Document 3). In those cases, places where chemicals are apt to reach, e.g. surfaces of large pores, are given priority in introducing the chelating groups, while the chelating groups are hard to be introduced onto places where chemicals are hard to reach, e.g. the interior of fine pores. Therefore, those membranes had problems that the distribution of chelating functional groups was nonuniform and it was difficult to secure sufficient capability to adsorb metal ions, and further problems of adsorption and clogging of water channel due to suspended solids in water. The cloth substrate provided with chelating functional groups (Patent Document 4) and the chelating functional group-containing fiber (Patent Document 5) have also been known, but they each had practical utility problems, such as adsorption and clogging of water channel due to suspended solids in water, and hence there was a necessity to provide the step for removing suspended solids in water in addition to the adsorption step for removing metal ions.

Under these circumstances, a composite separation membrane for performing removal by clarification and removal by adsorption at the same time has been disclosed (Patent Document 6). Therein, it is disclosed that filtration through the composite separation membrane provided with a layer having a three-dimensional network structure and a layer having a porous structure and containing an adsorbent allowed removal of suspended matter and metal ions (including boron ions) from seawater.

BACKGROUND ART DOCUMENT

Patent Document

Patent Document 1: JP-A-2007-160271
Patent Document 2: JP-A-58-205543
Patent Document 3: JP-A-7-24314
Patent Document 4: JP-A-2005-74378
Patent Document 5: JP-A-4-83532
Patent Document 6: JP-A-2010-227757

SUMMARY OF THE INVENTION

Problems that the Invention is to Solve

However, the adsorbents have their diameters in a range of 0.01 μm to 10 μm, and these diameters are incomparably larger than sizes of metal ions as targets for separation. Even when each adsorbent is distributed uniformly throughout the layer of porous structure, metal ions can easily pass through flow channels where no adsorbent is present. Thus, few metal ions get chances to come into contact with the adsorbent. As a result, the layer having a porous structure and containing an adsorbent cannot adsorb metal ions with high efficiency, and allows the metal ions to pass therethrough. As described above, the compatibility of removal of suspended matter with adsorptive removal of metal ions still has not been achieved in the conventional arts.

Considering the problems of the conventional arts, an object of the present invention is to provide a multilayer separation membrane having excellent performance on both removal of suspended solids in water and adsorptive removal of metal ions in water.

Means for Solving the Problems

In order to achieve the above-mentioned object, the present invention includes the following constitutions.

(1) A multilayer separation membrane including:
a porous adsorption layer including substantially a polymer having chelating functional groups; and
a porous clarification layer,
in which the porous clarification layer is disposed nearer to a raw water-side than the porous adsorption layer.
(2) The multilayer separation membrane according to (1), in which an average pore diameter A of pores in the porous adsorption layer and an average pore diameter B at a surface of the porous clarification layer satisfy a relation A>B.
(3) The multilayer separation membrane according to (1) or (2), in which the porous adsorption layer has a thickness of 10 µm to 500 µm.
(4) The multilayer separation membrane according to any one of (1) to (3), in which the porous adsorption layer is a layer throughout which the polymer having the chelating functional groups is distributed uniformly, and
when elemental analysis on cross sections of the porous adsorption layer is performed by an energy-dispersive X-ray analysis, an average value X of atom counts (%) of atoms derived from the chelating functional groups and a standard deviation Y thereof satisfy a relation $X \geq 3Y$.
(5) The multilayer separation membrane according to (4), in which the atoms derived from the chelating functional groups are at least one selected from the group consisting of N, O, P, S, Na and K.
(6) The multilayer separation membrane according to any one of (1) to (5), further including a supporting layer.
(7) The multilayer separation membrane according to any one of (1) to (6), which has a pure-water permeability of 0.10 $m^3/m^2/hr$ to 10 $m^3/m^2/hr$ under 50 kPa at 25° C., a rupture strength of 6 MPa or higher, and a rupture elongation of 10% or higher.
(8) The multilayer separation membrane according to any one of (1) to (7), in which the porous adsorption layer is a layer obtained in accordance with a thermally-induced phase separation method and/or a nonsolvent-induced phase separation method.
(9) The multilayer separation membrane according to any one of (1) to (8), in which the porous clarification layer is a layer obtained in accordance with a thermally-induced phase separation method and/or a nonsolvent-induced phase separation method.

Advantage of the Invention

Since the multilayer separation membrane of the present invention has a porous adsorption layer including substantially a polymer having chelating functional groups, it becomes possible to uniformly distribute chelating functional groups high in affinity for metal ions throughout the porous adsorption layer. As a result, the multilayer separation membrane can exhibit extremely high adsorption efficiency for metal ions.

In addition, the multilayer separation membrane of the present invention further includes a porous clarification layer. By disposing the clarification layer nearer to the raw water-side than the porous adsorption layer, it becomes possible for the multilayer separation membrane to perform removal of suspended matter in water by the porous clarification layer and then perform removal of metal ions by the porous adsorption layer. Thus, it becomes possible to suppress fouling of the porous adsorption layer with suspended matter. As a result, in the field of water treatment where short-time treatment for large amounts of water to be treated is required, it becomes possible to sufficiently perform removal of suspended solids in water and adsorptive removal of metal ions.

MODE FOR CARRYING OUT THE INVENTION

[1. Multilayer Separation Membrane]

The multilayer separation membrane of the present invention includes a porous adsorption layer (hereinafter referred to simply as "adsorption layer" in some cases) and a porous clarification layer (hereinafter referred to simply as "clarification layer" in some cases).

(1-1) Porous Adsorption Layer (a) Constitution

The porous adsorption layer includes substantially a polymer having chelating functional groups.

The term "chelating functional group" refers to a functional group capable of interacting with a specific metal ion and selectively adsorbing the metal ion. Electron donating atoms, such as nitrogen, oxygen, sulfur and phosphorus atoms, present in chelating functional groups coordinate with a metal ion to form a stable chelate, such as a 5-membered ring or a 6-membered ring, whereby the specific metal ion is selectively adsorbed. Examples of a chelating functional group and a metal ion targeted for removal are given below, but the present invention should not be construed as being limited to these combinations, and chelating functional groups selected appropriately on the basis of affinity for metal ions as targets of removal can be adopted. For example, an iminodiacetic acid group, which is a chelating functional group containing a nitrogen atom and oxygen atoms, is suitable for selective adsorption of metal ions such as iron, copper, manganese, lead, cadmium, mercury and chromium ions. An amidoxime group is suitable for selective adsorption of metal ions such as iron, manganese, lead, cadmium, cobalt, nickel, vanadium, titanium, copper and chromium ions. In addition, an N-methyl-glucamine group is suitable for selective adsorption of boron. As to the chelating functional groups containing sulfur atoms, for example, a mercapto group is suitable for selective adsorption of arsenic, and a dithiocarbamic acid group and a thiourea group are suitable for selective adsorption of mercury. An aminophosphoric acid group, which is a chelating functional group containing a phosphorus atom, is suitable for selective adsorption of metal ions such as iron, copper, lead, zinc, aluminum, nickel, manganese, titanium, cobalt and cadmium ions. In the cases of chelating functional groups containing carboxyl groups or phosphoric acid groups, such as an iminodiacetic acid group or an aminophosphoric acid group, they may be H-type groups, or they may be salt-type groups including Na salt-type and K salt-type groups, and conversion of those groups can be made by the use of an alkali or an acid as the need arises.

The polymer having chelating functional groups is a polymer having such chelating functional groups as recited above in its main chain and/or side chains.

Introduction of chelating functional groups into a polymer may be carried out using a known method, and examples of such a known method include a method of introducing chelating functional groups into a polymer through a chemical reaction, a method of introducing a chelating functional group into a monomer and then polymerizing the monomer to produce a homopolymer, and a method of copolymerizing a chelating functional group-introduced monomer with another monomer to produce a copolymer. For the purpose of distributing chelating functional groups uniformly throughout the adsorption layer, the higher the degree of uniformity in distribution of chelating functional groups through the polymer having the chelating functional groups, the more favorable.

In order to distribute chelating functional groups uniformly throughout the adsorption layer, it is favorable to adopt a method of introducing a chelating functional group into a monomer through chemical reaction to prepare a chelating functional group-introduced monomer and then copolymerizing the chelating functional group-introduced monomer and another monomer to produce a copolymer.

As to the method for introducing a chelating functional group through chemical reaction, any of known methods may be used.

For example, when the chelating functional groups are those having such functional groups as amino groups, the use of monomers having epoxy groups allows introduction of the chelating functional groups into monomers through ring-opening reaction of the epoxy groups. As such epoxy group-containing monomers, glycidyl methacrylate and allyl glycidyl ether can be preferably used because they are available at low prices.

On the other hand, another monomer to be copolymerized with a chelating functional group-introduced monomer has no particular restrictions so long as it can react with the monomer into which the chelating functional groups have been introduced through chemical reaction, but considering that the produced copolymer is used for water treatment, it is appropriate that the monomer for copolymerization is selected from monomers capable of making the produced copolymers insoluble in water. As monomers for such copolymerization, vinyl monomers such as methyl methacrylate, methyl acrylate, acrylonitrile, vinyl acetate and styrene can be used appropriately because of their low prices.

In order to control the copolymerization capability, monomers to be used may be selected on the basis of Alfrey-Price's Q-e scheme. The Alfrey-Price's Q values were proposed in 1948 by T. Alfrey and C. C. Price as indices for the degrees of conjugating double bonds in radical polymerizable monomers and substituents therein, together with e values as indices for electron densities of those double bonds, and those values about a large number of monomers have been determined by experiments on the basis of styrene (Q=1.0, e=−0.8).

The Q and e values of representative monomers are summarized in J. Brandrup, E. H. Immergut & E. A. Grulke, Polymer Handbook, 4th edition, pages 11/181 to 11/319, John Wiley & Sons Inc. (the U.S.A.), 1999, and those values can be referred to them, or Q and e values may also be derived in accordance with the following method.

The derivation method includes the following steps. To begin with, a monomer $M_1$ for which knowledge of Q and e values is desired and a monomer $M_2$ whose Q and e values are already known are copolymerized at various molar ratios ($F=[M_1]/[M_2]$), and a ratio between amounts of the individual monomers consumed in an early stage of each copolymerization ($f=d[M_1]/d[M_2]$) is calculated from the data obtained by measurement using gas chromatography or the like. It is already known that the F and f values satisfy the following expression ($\alpha$), and hence by plotting $F(f-1)/f$ against $F^2/f$ and approximating the plots by a straight line, the copolymerization reactivity ratios $r_1$ and $r_2$ are determined from the slope and vertical axis intercept of the straight line.

$$F(f-1)/f = r_1 F^2/f - r_2 \quad \text{Expression } (\alpha)$$

Then, the polymerization reactivity ratios $r_1$ and $r_2$, and the Q and e values ($Q_2$ and $e_2$) of the monomer $M_2$ are applied to the expression ($\beta$) and the expression ($\gamma$), respectively, proposed by T. Alfrey and C. C. Price, whereby Q ($Q_1$) and e ($e_1$) values of the monomer $M_1$ can be derived.

$$r_1 = (Q_1/Q_2)\exp[-e_1(e_1-e_2)] \quad \text{Expression } (\beta)$$

$$r_2 = (Q_2/Q_1)\exp[-e_2(e_2-e_1)] \quad \text{Expression } (\gamma)$$

Details about the method mentioned above can be known by reference to Literature 1 (M. Fineman et al., Journal of Polymer Science, vol. 5, pp. 259-265, John Wiley & Sons Inc., 1950) and Literature 2 (Takayuki OHTSU, Kaitei Kobunshi Gosei no Kagaku (Revised version, Chemistry of Polymer Synthesis), pp. 111-116, KAGAKUDOJIN, 1992).

If it is possible to know beforehand the Q and e values of a monomer intended for use in copolymerization, it will become possible to derive a copolymerization reactivity ratio on the basis of those values, and to make prediction about the copolymer composition on the basis of the derived ratio. As to the copolymer composition, random, block and alternating copolymers can be thought of, and in response to the intended copolymer composition, monomers having Q and e values allowing appropriate compositional ratios in copolymerization can be selected arbitrarily.

The chelating functional group content of a polymer having chelating functional groups may be selected as appropriate on the basis of properties of the polymer, properties of the chelating functional groups and the environment in which the polymer will be used. In general, the higher the chelating functional group content, the greater efficiency can be brought in metal ion adsorption, but the higher the water solubility of the polymer becomes, and the more likely the polymer is to have a swelling or the like. Accordingly, when the polymer having chelating functional groups is a homopolymer, it is appropriate for the homopolymer to be made insoluble in water by undergoing such treatment as thermal cross-linking or chemical cross-linking. On the other hand, when the polymer having chelating functional groups is a copolymer or the chelating functional groups are introduced into a polymer through chemical reaction, it is good enough to determine experimentally the conditions for achieving the highest possible chelating functional group content while ensuring water insolubility to an extent that the copolymer or the polymer are usable in water treatment. To be more specific, the chelating functional group content of a polymer having chelating functional groups is preferably from 0.1 mol % to 50 mol %, more preferably from 1 mol % to 30 mol %, further preferably from 5 mol % to 20 mol %. By controlling the copolymerization ratio between a monomer into which chelating functional groups have been introduced through chemical reaction and another monomer, the chelating functional group content can be adjusted to the range as described above. In the case of introducing chelating functional groups into a polymer through chemical reaction, the chelating functional group content can be adjusted to the range as described above by controlling appropriately conditions for the chemical reaction, such as reaction temperature, reaction time, amounts of reagents used, and molar ratio.

The porous adsorption layer includes substantially a polymer having chelating functional groups as mentioned above, and the polymer has in its structure the chelating functional groups. As a result, the chelating functional groups are distributed uniformly throughout the porous adsorption layer.

The expression of "including substantially" as used herein means that a polymer having chelating functional groups is the prime constituent of the porous adsorption layer, and such a polymer accounts for e.g. preferably at least 70 wt %, more preferably at least 80 wt %, further preferably at least 90 wt %, of the porous adsorption layer in the dry state. And it is most desirable that the porous adsorption layer consists of a polymer having chelating functional groups.

Determination as to whether or not the chelating functional groups are distributed uniformly throughout the porous adsorption layer may be performed e.g. by carrying out elemental analysis by the energy-dispersive X-ray analysis attached to a scanning electron microscope and checking for absence of a significant bias in distribution of atoms derived from chelating functional groups. In this case, the elemental analysis using the energy-dispersive X-ray analysis is carried out at 20 or more different spots, preferably at 50 or more different spots, in a porous adsorption layer under a magnification of 5,000 times, whereby the atom count (%) of atoms derived from chelating functional groups is measured at each spot and the degree of a bias is checked. As to the index to the bias, a standard deviation is preferably used. The porous adsorption layer according to the present invention features a layer throughout which the polymer having chelating functional groups is distributed uniformly, and when elemental analysis on cross-sections of the porous adsorption layer is performed by the energy-dispersive X-ray analysis, it is desirable for the layer to be in the state of a uniform distribution in which an average value X of atom counts (%) of atoms derived from the chelating functional groups and a standard deviation Y thereof preferably satisfy a relation $X \geq 3Y$, more preferably a relation $X \geq 5Y$, further preferably a relation $X \geq 7Y$.

As to the atoms derived from the chelating functional groups, any atoms can be used as long as they allow identification of chelating functional groups, and examples thereof include atoms constituting chelating functional groups and atoms capable of forming salts together with chelating functional groups. In the cases of the chelating functional groups exemplified above, at least one selected from the group consisting of N, O, P, S, Na and K is preferably used. As alternative means of identifying chelating functional groups, it is also conceivable that, through the use of selective adsorption of specific metal ions onto the functional groups, specific metal ions are made to adsorb onto the chelating functional groups and then the number (%) of the adsorbed metal ions is determined.

As to the thickness of the porous adsorption layer, when the thickness thereof becomes large, chances for contact between metal ions and the chelating functional groups are increased to result in enhancement of adsorption efficiency. However, when the thickness thereof becomes too large, flow channel resistance of water in the separation membrane increases, whereby permeability is lowered. Accordingly, the thickness of the porous adsorption layer is preferably from 10 µm to 500 µm, more preferably from 20 µm to 200 µm, further preferably from 30 µm to 100 µm.

Incidentally, the porous adsorption layer includes substantially a polymer having chelating functional groups, but may contain other ingredients such as organic substances, inorganic substances and other polymers so long as they cause no departure from the gist of the present invention, namely so long as they cause no obstruction to uniform distribution of chelating functional groups.

The average pore diameter of pores in the porous adsorption layer may be made equal to or greater than the average pore diameter of pores in a porous clarification layer described hereafter, since the porous clarification layer bears a separation function such as clarification. However, too large the pores in the porous adsorption layer causes reduction in chances for contact between metal ions in raw water and the chelating functional groups. From this point of view, it is desirable that the average pre diameter A of pores in the porous adsorption layer is greater than the average pore diameter B of pores at the surface of the porous clarification layer, namely A>B. And for achievement of compatibility between high adsorption capability and high water permeability, the average pre diameter of pores in the porous adsorption layer is preferably from 1 nm to 1 µm, more preferably from 5 nm to 0.5 µm, further preferably from 10 nm to 0.1 µm.

The average pore diameter of pores in the porous adsorption layer is determined by taking photographs of cross-sections in the depth direction of the porous adsorption layer by the use of a scanning electron microscope under a magnification of 60,000 times, measuring the diameters of 10 or more pores, preferably 20 or more pores, selected arbitrarily on the raw water side, and working out a number average of the measured diameter values. When the pores are not circular, diameters of the pores are determined by evaluating diameters of circles having the same areas as the pores have (equivalent circles) by an image processor or the like, and defining the diameters of the equivalent circles as the diameters of the pores. The expression "pores selected arbitrarily on the raw water side" refers to the pores within 1 µm in thickness and near to the raw water side in cross sections in the depth direction of the porous adsorption layer.

(b) Method of Forming

The porous adsorption layer described above can be produced by using a polymer having chelating functional groups in accordance with a phase separation method, such as a thermally-induced phase separation method and a nonsolvent-induced phase separation method. Methods for introducing chelating functional groups into a polymer are as already described above.

The term "thermally-induced phase separation" as used herein refers to a method of inducing phase separation by cooling a solution of a polymer dissolved at a high temperature to a temperature below the binodal line as a boundary between one-phase region and two-phase region, thereby causing crystallization or glass transition of the polymer to result in structure fixation. The term "nonsolvent-induced phase separation" as used herein refers to a method of inducing phase separation through infiltration of a nonsolvent into a homogeneous polymer solution or through a concentration change caused by evaporation of the solvent into the external atmosphere.

In the thermally-induced phase separation method, a polymer solution is prepared by dissolving a polymer having chelating functional groups in a poor or good solvent at a relatively high temperature in a relatively high concentration of about 20 wt % to 60 wt %, and the thus prepared polymer solution is cooled and solidified to undergo phase separation, resulting in formation of a porous structure. Herein, the term "a poor solvent" refers to a solvent in which a polymer cannot be dissolved in a concentration of 5 wt % or higher at a low temperature such as 60° C. or lower, but the polymer can be dissolved in a concentration of 5 wt % or higher at a high temperature range such as from above 60° C. to the melting point of the polymer. In contrast to the poor solvent, the term "a good solvent" is a solvent in which a polymer can be dissolved in a concentration of 5 wt % or higher even in a low-temperature range of 60° C. or below, and a solvent in which a polymer is neither dissolved nor swollen at temperatures up to the melting point of the polymer or the boiling point of the solvent is defined as the nonsolvent. Even in the case of a poor solvent-nonsolvent mixture, as far as the mixture satisfies the above definition of a poor solvent, the mixture is defined as a poor solvent.

As the concentration of a polymer becomes high, a separation membrane having high strength and high elongation can be obtained. However, too high a polymer concentration causes reduction in porosity to result in lowering of permeability. In addition, unless the polymer solution has its viscosity in a proper range, the handling thereof becomes difficult, and it becomes impossible to form membranes. Accordingly, it is preferred that the polymer concentration is in a range of 30 wt % to 50 wt %. For cooling and solidification of the polymer solution, it is appropriate to adopt a method of discharging the polymer solution from a spinneret into a cooling bath. At this time, it is appropriate that the polymer solution is solidified by using as a cooling liquid for the cooling bath, containing a poor solvent or a good solvent in a concentration of 60 wt % to 100 wt % and having its temperature in a range of 5° C. to 50° C. Into the cooling liquid, a nonsolvent may be mixed in addition to a poor solvent or a good solvent. However, when a liquid containing a nonsolvent as a main component is used as the cooling liquid, nonsolvent-induced phase separation due to infiltration of the nonsolvent tends to take priority over the phase separation resulting from cooling solidification.

In the method of nonsolvent-induced phase separation, the polymer solution is prepared by dissolving a polymer having chelating functional groups in a good solvent in a concentration of generally 5 wt % to 30 wt %, preferably 10 wt % to 25 wt %, and immersed in a solidification bath to cause infiltration of a nonsolvent; as a result, phase separation occurs, thereby allowing formation of porous structure. Polymer concentrations lower than 5 wt % cause reduction in physical strength, while those higher than 30 wt % cause reduction in permeability. Herein, the temperature for dissolving a polymer in a solvent varies depending on the kind and concentration of the polymer, and the kind of the solvent. For preparation of a stable solution of the polymer with satisfactory reproducibility, it is appropriate that the polymer solution is prepared into a transparent solution through the heating with stirring for several hours at a temperature equal to or lower than the boiling point of the solvent used.

The nonsolvent-induced phase separation in particular is preferable, because chelating functional groups tend to be configured to be distributed unevenly on the flow channel side, whereby it becomes possible to efficiently utilize the chelating functional groups.

(1-2) Porous Clarification Layer (a) Constitution

It is essential only that the porous clarification layer is able to remove substances to be clarified from raw water by adsorption or filtration. And it is particularly desirable that the relation between an average pore diameter A of pores in the porous adsorption layer and an average pore diameter B of pores at the surface of the porous clarification layer is A>B.

The porous clarification layer can contain one or more of known polymers. Examples of a variety of known polymers include polyethylene, polypropylene, acrylic resins, polyacrylonitrile, acrylonitrile-butadiene-styrene (ABS) resins, polystyrene, acrylonitrile-styrene (AS) resins, vinyl chloride resins, polyethylene terephthalate, polyamide, polyacetal, polycarbonate, modified polyphenylene ether, polyphenylene sulfide, fluororesin-based polymers, polyamidimide, polyether imide, polysulfone, polyether sulfone, and mixtures or copolymers of two or more of the above. In addition, other resins miscible with the polymers recited above may be admixed with any of the polymers recited above.

Incidentally, the term "a fluororesin-based polymer" as used in the present invention refers to the resin containing a vinylidene fluoride homopolymer and/or a vinylidene fluoride copolymer. The fluororesin-based polymer may also contain two or more kinds of vinylidene fluoride copolymers. As an example of the vinylidene fluoride copolymers, mention may be made of a copolymer of vinylidene fluoride with at least one selected from the group consisting of vinyl fluoride, ethylene tetrafluoride, propylene hexafluoride and ethylene trichloride fluoride.

In addition, the weight-average molecular weight of the fluororesin-based polymer may be selected as appropriate in response to the strength and water permeability required of the polymer separation membrane, and the higher the weight-average molecular weight, the lower the water permeability becomes, while the lower the weight-average molecular weight, the lower the strength becomes. Accordingly, it is appropriate that the weight-average molecular weight thereof is from 50,000 to 1,000,000. In the case of using a polymer separation membrane for water treatment in which the membrane is exposed to a chemical solution for use in cleaning, the weight-average molecular weight thereof is preferably from 100,000 to 700,000, more preferably from 150,000 to 600,000.

When the porous clarification layer is made to assume a role of physical protection for the porous adsorption layer, it is appropriate that any of the polymers recited above is used as a main constituent because it can enhance mechanical strength. And any of the polymers recited above accounts for preferably at least 70 wt %, more preferably at least 80 wt %, further preferably at least 90 wt %, of the porous clarification layer in the dry state. Of the polymers recited above, the fluororesin-based polymers are preferably used because they have high resistance to various chemical agents used for water treatment purpose and high mechanical strength.

The thickness of the porous clarification layer can be adjusted freely so as to satisfy the conditions required of various properties including separation characteristics, water permeability, chemical strength (chemical resistance), physical strength and antifouling property. However, the porous clarification layer having a small thickness is poor in separation characteristics and physical strength, while that having a great thickness is poor in water permeability. Accordingly, with consideration given to a balance of the various properties as recited above and to operating costs as well, the thickness of the porous clarification layer is preferably from 5 μm to 100 μm, more preferably from 10 μm to 50 μm.

When the porous clarification layer is positioned in the outermost layer on the side of targets for separation, pores are seen by observation of the outermost layer surface from a point directly above this layer. The porous clarification layer bears separation functions such as clarification, and the average pore diameter of the pores therein may be changed in response to the application purpose of the porous clarification layer.

Although an appropriate average pore diameter at the surface of the porous clarification layer varies depending on substances targeted for separation, from the viewpoint of ensuring compatibility between high removability and high water permeability, the average pore diameter thereof is preferably from 1 nm to 1 μm, more preferably from 5 nm to 0.5 μm, further preferably from 10 nm to 0.1 μm. In the use for water treatment in particular, the average pore diameter at the surface of the porous clarification layer is preferably in a range of 0.005 µm to 0.5 µm, more preferably in a range of 0.01 µm to 0.2 µm. As far as the average pore diameter at the surface is in such a range, the pores are less likely to be clogged with contaminants in water, and the water permeability is less likely to be deteriorated, and hence the separation membrane can be used continuously for a longer period of time. In addition, even when clogging occurs, the contaminants can be removed by so-called backwashing or air scrubbing.

The contaminants herein are different in each water source, and in the case where the water source is e.g. a river, a lake, a marsh or the like, they include soil- or mud-derived inorganic matter, colloids and microorganisms and dead bodies thereof, and plant-derived humic substances and the like. The term "backwashing" refers to the operation of making permeate pass through a membrane in the direction opposite to the direction in normal filtration, and the term "air scrubbing" e.g. in the case of a hollow-fiber membrane refers to the operation of vibrating a hollow-fiber membrane by sending air onto the membrane to result in removal of contaminants accumulated on the membrane surface.

The average pore diameter at the surface of the porous clarification layer is determined by taking photographs of the surface of the porous clarification layer by the use of a scanning electron microscope under a magnification of 60,000 times, measuring the diameters of arbitrarily selected 10 or more pores, preferably 20 or more pores, and working out a number average of the measured diameter values. When the pores are not circular, diameters of the pores are determined by evaluating diameters of circles having the same areas as the pores have (equivalent circles) by an image processor or the like, and defining the diameters of the equivalent circles as the diameters of the pores. When the porous clarification layer is not disposed as the outermost layer, the average pore diameter of pores in the porous clarification layer is determined by taking photographs of cross-sections in the depth direction of the porous clarification layer by the use of a scanning electron microscope under a magnification of 60,000 times, measuring the diameters of 10 or more pores, preferably 20 or more pores, selected arbitrarily on the raw water side, and working out a number average of the measured diameter values. When the pores are not circular, diameters of the pores are determined by evaluating diameters of circles having the same areas as the pores have (equivalent circles) by an image processor or the like, and defining the diameters of the equivalent circles as the diameters of the pores. The expression "pores selected arbitrarily on the raw water side" refers to the pores within 1 µm in thickness and near to the raw water side in cross sections in the depth direction of the porous clarification layer.

As to the upper-lower or inside-outside relation in placement of the porous clarification layer and the porous adsorption layer, it is required to place the porous clarification layer on the raw water side for the purpose of preventing the porous adsorption layer from being fouled with suspended matter. More specifically, it is required to adopt the placement which makes it possible to perform, to begin with, clarification of suspended matter in raw water by the porous clarification layer, and then adsorption of metal ions in the raw water by the porous adsorption layer. In addition, for the purpose of suppressing the deterioration in permeability due to adhesion of contaminants such as suspended matter, it is desirable that the porous clarification layer bearing a separation function is located as the outermost surface layer on the raw water side.

The multilayer separation membrane of the present invention can be preferably used in either of two forms, the form of a hollow-fiber membrane and the form of a flat-sheet membrane, but the form of a hollow-fiber membrane is preferred because a hollow-fiber membrane allows highly efficient loading and increase in effective membrane surface per unit volume.

(b) Method of Forming

The porous clarification layer can be produced by using any of various known polymers as mentioned above in accordance with a phase separation method such as the aforementioned thermally-induced phase separation method and nonsolvent-induced phase separation method. The nonsolvent-induced phase separation method is particularly preferred because it allows easy control of an average pore diameter at the surface by a method as described below.

The method of controlling the average pore diameter at the surface in the case of using the nonsolvent-induced phase separation method is, though different depending on the kind and concentration of a polymer used, e.g. as follows. The average pore diameter at the surface can be controlled by adding a pore diameter-controlling additive into a polymer solution, and allowing elution of the additive to occur at the time of formation of the porous clarification layer or after formation of the porous clarification layer. Examples of such an additive include organic compounds and inorganic compounds. The suitable ones as the organic compounds are those soluble in both solvents usable in the polymer solution and nonsolvents capable of causing nonsolvent-induced phase separation. Examples of such an organic compound include water-soluble polymers such as polyvinyl pyrrolidone, polyethylene glycol, polyethylene imine, polyacrylic acid and dextran, surfactants, glycerin and saccharides. The suitable ones as the inorganic compounds are those soluble in both solvents usable in the polymer solution and nonsolvents capable of causing nonsolvent-induced phase separation. Examples of such an inorganic compound include calcium chloride, magnesium chloride, lithium chloride and barium sulfate. Alternatively, it is possible to control the average pore diameter at the surface without using an additive by the control of a phase-separating speed through appropriate choices of the kind, concentration and temperature of a nonsolvent in a solidification bath. In general, higher phase-separating speed makes the average pore diameter at the surface the smaller, while lower phase-separating speed makes the average pore diameter at the surface the larger. Further, addition of a nonsolvent to the polymer solution is also effective in controlling the phase-separating speed.

(1-3) Other Layer

As a layer other than the porous clarification layer and the porous adsorption layer, it is preferable to provide a supporting layer higher in mechanical strength and larger in diameter of pores than those layers because it can enhance the mechanical strength without impairing the permeability of the separation membrane. It is particularly advantageous to protection of the porous adsorption layer relatively apt to swell that the porous clarification layer high in mechanical strength as described above is selected, a supporting layer is provided and further the porous adsorption layer is sandwiched between these layers. Such a supporting layer may be a layer formed by using either the thermally-induced phase separation method or the nonsolvent-induced phase separation method, or a porous substrate. The porous substrate has no particular restriction, or equivalently, it may be e.g. an organic material, an inorganic material or the like, but it is preferably an organic fiber in view of easy reduction in weight. As the porous substrate, woven fabrics or nonwoven fabrics made of organic fibers such as cellulose-based fibers, acetyl cellulose-based fibers, polyether-based fibers, polypropylene-based fibers and polyethylene-based fibers are more preferably used.

(1-4) Characteristics

It is preferable for the multilayer separation membrane of the present invention to have a pure-water permeability of 0.10 m$^3$/m$^2$/hr to 10 m$^3$/m$^2$/hr under 50 kPa at 25° C., a rupture strength of 6 MPa or higher and a rupture elongation of 10% or higher. In addition, it is appropriate that the multilayer separation membrane of the present invention has a removal ratio of 0.309 μm-diameter particles in a range of 90% or higher. The pure-water permeability thereof is more preferably from 0.30 m$^3$/m$^2$/hr to 7 m$^3$/m$^2$/hr. The rupture strength thereof is more preferably 7 MPa or higher. The rupture elongation thereof is more preferably 20% or higher. The removal ratio of 0.309 μm-diameter particles is more preferably 95% or higher. By satisfying the conditions specified above, it becomes possible to obtain a separation membrane having sufficient strength and water permeability for uses in water treatment, medical care, food industries, battery separators, charged membranes, fuel-cell electrolytic membrane and so on.

Methods for measuring rupture strength and rupture elongation have no particular restrictions, and the rupture strength and the rupture elongation can be determined e.g. by conducting tensile tests on 5 or more test specimens individually, each of which has a measurement length of 50 mm, at a tension rate of 50 mm/min by the use of a tensile testing machine, measuring values of rupture strength and those of rupture elongation in individual tests and working out the respective average values.

The multilayer separation membrane of the present invention features excellence in both removal of suspended matter in water and adsorptive removal of metal ions in water.

Herein, the capability of removing metal ions by adsorption, namely the metal-ion removal performance, can be evaluated by using an ICP emission analyzer and carrying out quantitative analyses of metal ion concentrations before and after filtration.

In the present invention, a compact module including 4 hollow-fiber membranes and having an effective length of 200 mm is made, and dead-end filtration of an aqueous solution containing certain metal ions in a predetermined concentration through the compact module is conducted for 30 minutes under external pressure on the condition that the filtration pressure difference is 16 kPa and the temperature is 25° C., and then concentrations of metal ions present in the feed water and the permeate are analyzed individually with an ICP emission analyzer (P-4010, manufactured by Hitachi, Ltd.), thus the metal-ion removal performance (%) can be determined by the following expression.

Metal-ion removal performance (%)=[1−2×(metal ion concentration in permeate)/{(metal ion concentration in feed water at the time of the start of measurement)+(metal ion concentration in feed water at the time of the end of measurement)}]×100

On the other hand, the suspended-solid removal performance can be evaluated by carrying out quantitative analyses of suspended solid concentrations before and after filtration by using a spectrophotometer. In the present invention, a compact module including 4 hollow-fiber membranes and having an effective length of 200 mm is made, and dead-end filtration of an aqueous solution containing as a suspended solid polystyrene latex particles having an average diameter of 0.309 μm (a reagent, manufactured by Magsphere Inc.) in a concentration of 20 ppm is conducted through the compact module for 30 minutes under external pressure on the condition that the filtration pressure difference is 16 kPa and the temperature is 25° C., and then concentrations of the suspended solid present in the feed water and the permeate individually are calculated from UV absorption coefficients at a wavelength of 234 nm, and the suspended-solid removal performance (%) is determined from a ratio between the concentrations. Herein, the UV absorption coefficient measurements at a wavelength of 234 nm are made by the use of a spectrophotometer (U-3200, manufactured by Hitachi, Ltd.). And the suspended-solid removal performance (%) can be determined by the following expression.

Suspended-solid removal performance (%)=[1−2×(suspended solid concentration in permeate)/{(suspended solid concentration in feed water at the time of the start of measurement)+(suspended solid concentration in feed water at the time of the end of measurement)}]×100

Incidentally, in addition to suspended-solid removal performance, another important point in actual water treatment is that the separation membranes used therein are superior in resistance to suspended solids, namely has antifouling performance. In general, separation membranes for use in water treatment are used over a time period of 5 to 10 years, and therefore they are required to recover their filtration performance by backwashing even when they continue to be used for filtration of raw water containing suspended solids, thereby ensuring high repeated-use potentiality.

The antifouling performance can be evaluated by comparing pure-water permeation performance between before and after filtration of an aqueous solution containing a suspended solid. In the present invention, a compact module including 4 hollow-fiber membranes and having an effective length of 200 mm is made, distilled water is fed into the compact module for 1 hour on the condition that the filtration pressure difference is 16 kPa and the temperature is 25° C., and the volume (m$^3$) of the thus obtained permeate is measured, converted into a numeric value per unit time (h) and unit membrane area (m$^2$), and further expressed in terms of pressure (50 kPa), and the thus obtained numeric value is defined as pure-water permeation performance (Q0, unit: m$^3$/m$^2$/h). Additionally, the unit membrane area is worked out from the average outer diameter and the effective length of the hollow-fiber membrane. Next, dead-end filtration of an aqueous solution containing humic acid (a reagent, manufactured by Wako Pure Chemical Industries, Ltd.) as a typical suspended solid in a concentration of 20 ppm is conducted through the compact module under external pressure on the condition that the filtration pressure difference is 16 kPa and the temperature is 25° C. until the volume of permeate obtained reaches 2 m$^3$/m$^2$. Further, the feed of permeate is conducted for 1 minute under backwashing pressure of 150 kPa, and immediately thereafter pure-water permeation performance (Q1) is measured. In the case of adopting A=Q1/Q0 as an index of antifouling performance, the greater the value of A, the higher antifouling performance the separation membrane has.

[2. Manufacturing Method]

The multilayer separation membrane of the present invention including the porous adsorption layer and the porous clarification layer as mentioned above can be manufactured in accordance with various methods. For example, there is a method in which formation of a single layer of the porous adsorption layer or multiple layers including the porous adsorption layer is carried out, followed by stacking thereon the porous clarification layer. In such a method, it is possible to form in advance the single layer of the porous adsorption layer or the multiple layers including the porous adsorption layer in accordance with the thermally-induced phase separation method or the nonsolvent-induced phase separation method, and apply to such a layer or layers a polymer solution for formation of a porous clarification layer, and then form the applied polymer solution into the porous clarification layer in accordance with the thermally-induced phase separation method or the nonsolvent-induced phase separation method. Herein, sequential formation of the multiple layers including the porous adsorption layer through the use of the thermally-induced phase separation method or the nonsolvent-induced phase separation method makes it possible to provide layers other than the porous clarification layer and the porous adsorption layer.

As another method of forming the multilayer separation membrane including the porous adsorption layer and the porous clarification layer, there is e.g. a method of forming the porous adsorption layer and the porous clarification layer at the same time by the use of a spinneret capable of discharging two or more kinds of polymer solutions.

The spinneret used for discharging a polymer solution for formation of the porous adsorption layer and a polymer solution for formation of the porous clarification layer at the same time has no particular restrictions, but when it is intended to give the shape of a flat-sheet membrane to the separation membrane, a spinneret having e.g. the shape of a double slit having two slits in parallel is preferably used. On the other hand, when it is intend to give the shape of hollow fiber to the separation membrane, a spinneret having the shape of e.g. a triple-tube type is preferably used. While a polymer solution for formation of the porous clarification layer and a polymer solution for formation of the porous adsorption layer are discharged from the outside tube and intermediate tube of the spinneret of a triple-tube type, respectively, and simultaneously therewith a bore-forming fluid is discharged from the inside tube, they are solidified in a solidification bath, whereby a hollow-fiber membrane is formed. A hollow-fiber membrane having the porous clarification layer in the outer portion and the porous adsorption layer in the inner portion can be formed by discharging a polymer solution for formation of the porous clarification layer from the outside tube and a polymer solution for formation of the porous adsorption layer from the intermediate tube, and contrary thereto, a hollow-fiber membrane having the porous clarification layer in the inner portion and the porous adsorption layer in the outer portion can be formed by discharging a polymer solution for formation of the porous clarification layer from the intermediate tube and a polymer solution for formation of the porous adsorption layer from the outer tube. Herein, layers other than the porous clarification layer and the porous adsorption layer can also be formed by the use of a spinneret having the shape of a multiple slit in the case where the separation membrane has the shape of a flat-sheet membrane, or the use of a spinneret having the shape of a multiple tube in the case where the separation membrane has the shape of a hollow-fiber membrane.

EXAMPLES

The present invention will be described more specifically with reference to the following examples, but these examples should not be construed as limiting the scope of the present invention in any way. Additionally, the physical property values concerning the present invention can be determined by the following methods.

(1) Average Thickness and Average Pore Diameter

Photographs of cross sections of a multilayer separation membrane under a magnification of 500 to 3,000 times by a scanning electron microscope were taken. In the thus obtained photographs, thickness measurements on each of constituent layers were made at arbitrarily selected 10 points, and the number average was worked out from the thus measured values and defined as average thickness of each constituent layer.

As to the average pore diameter of a porous clarification layer, photographs of the porous clarification layer surface under a magnification of 60,000 times by a scanning electron microscope were taken. In the thus obtained photographs, diameters of arbitrarily selected 10 pores were measured, and the number average thereof was worked out and defined as an average pore diameter of the porous clarification layer.

As to the average pore diameter of a porous adsorption layer, photographs of cross sections of a multilayer separation membrane under a magnification of 60,000 times by a scanning electron microscope were taken. In the thus obtained photographs, diameters of arbitrary selected 10 pores present within a thickness of 1 μm on the side near the raw water side were measured, and the number average thereof was worked out and defined as an average pore diameter of the porous adsorption layer.

(2) Copper or Boron Removal Performance

A compact module including 4 hollow-fiber membranes and having an effective length of 200 mm was made. Dead-end filtration of an aqueous solution of copper sulfate (copper concentration: 10 mg/L) or an aqueous solution of boric acid (boron concentration: 5 mg/L) through the compact module was conducted for 30 minutes under external pressure on the condition that the filtration pressure difference was 16 kPa and the temperature was 25° C., and then concentrations of copper or boron ions in the feed water and the permeate were analyzed individually with an ICP emission analyzer (P-4010, manufactured by Hitachi, Ltd.). Copper removal performance (%) and boron removal performance (%) are defined by the following expressions, respectively.

$$\text{Copper removal performance (\%)} = [1 - 2 \times (\text{copper concentration in permeate})/\{(\text{copper concentration in feed water at the time of the start of measurement}) + (\text{copper concentration in feed water at the time of the end of measurement})\}] \times 100$$

$$\text{Boron removal performance (\%)} = [1 - 2 \times (\text{boron concentration in permeate})/\{(\text{boron concentration in feed water at the time of the start of measurement}) + (\text{boron concentration in feed water at the time of the end of measurement})\}] \times 100$$

(3) Suspended-Solid Removal Performance

A compact module including 4 hollow-fiber membranes and having an effective length of 200 mm was made. Through this module, dead-end filtration of an aqueous solution containing, as a suspended ingredient, polystyrene latex particles having an average diameter of 0.309 μm (a reagent, manufactured by Magsphere Inc.) in a concentration of 20 ppm was conducted for 30 minutes under external pressure on the condition that the filtration pressure difference was 16 kPa and the temperature was 25° C., and then concentrations of the suspended solid present in the feed water and the permeate were calculated individually from UV absorption coefficients at a wavelength of 234 nm, and the suspended-solid removal performance (%) was determined from a ratio between the concentrations. Herein, the UV absorption coefficient measurements at a wavelength of 234 nm were made by the use of a spectrophotometer (U-3200, manufactured by Hitachi, Ltd.). The suspended-solid removal performance (%) is defined by the following expression.

Suspended-solid removal performance (%)=[1−2×(suspended solid concentration in permeate)/{(suspended solid concentration in feed water at the time of the start of measurement)+(suspended solid concentration in feed water at the time of the end of measurement)}]×100

(4) Pure-Water Permeability

A compact module including 4 hollow-fiber membranes and having an effective length of 200 mm was made. Distilled water was fed into this module for 1 hour on the condition that the filtration pressure difference was 16 kPa and the temperature was 25° C., and the volume (m$^3$) of the thus obtained permeate was measured and converted into numeric values per unit time (h) and unit membrane area (m$^2$), and further expressed in terms of pressure (50 kPa). The thus obtained numeric value was defined as pure-water permeation performance (Q0, unit: m$^3$/m$^2$/h). Incidentally, the unit membrane area was worked out from the average outer diameter and the effective length of the hollow-fiber membrane. Next, dead-end filtration of an aqueous solution containing humic acid (a reagent, manufactured by Wako Pure Chemical Industries, Ltd.) as a typical suspended solid in a concentration of 20 ppm was conducted through the compact module under external pressure on the condition that the filtration pressure difference was 16 kPa and the temperature was 25° C. until the volume of permeate obtained reached 2 m$^3$/m$^2$. Further, the feed of permeate was conducted for 1 minute under backwashing pressure of 150 kPa, and immediately thereafter pure-water permeation performance (Q1) was measured.

(5) Antifouling Performance

A=Q1/Q0 was adopted as an index of antifouling performance. A greater value of A means that the hollow-fiber membrane has the higher antifouling performance.

(6) Rupture Strength

Tensile tests were conducted on 5 or more test specimens individually, each of which had a measurement length of 50 mm, at a tension rate of 50 mm/min by the use of a tensile testing machine (TENSILON (trade mark) RTM-100, manufactured by Toyo Baldwin Co., Ltd.), and values of rupture strength were determined in individual tests, and the average value thereof was worked out and defined as rupture strength.

(7) Preparation of Polymer Having Chelating Functional Groups

Chelating functional group-containing polymer A, polymer B, polymer C and polymer D were prepared in the following manners, respectively. Each of the polymer A, the polymer B and the polymer C was a polymer having iminodiacetic acid groups as its chelating functional groups, and the polymer D was a polymer having N-methyl-glucamine groups as its chelating functional groups.

Sodium iminodiacetate (54.8 g) was dissolved in 500 g of pure water, and into this solution was charged glycidyl methacrylate in such an amount as to achieve a molar ratio of 1:1 between glycidyl methacrylate and sodium iminodiacetate. The resulting mixture was heated at 70° C. for 1 hour with stirring, and subjected to reduced-pressure drying at 80° C., thereby preparing disodium iminodiacetate-incorporated glycidyl methacrylate (IDANa-GMA). Next, the thus prepared IDANa-GMA was dissolved in 200 g of pure-water/ethanol mixture (weight ratio between pure water and ethanol: 1:1), and thereinto was charged methyl methacrylate in such an amount as to achieve a molar ratio of 10:1 between methyl methacrylate and IDANa-GMA. Thereto, potassium persulfate was added so as to be 0.3 wt % based on the methyl methacrylate content, and those monomers were copolymerized by heating at 70° C. for 5 hours while bubbling with nitrogen gas. The thus obtained colloidal product was filtrated off, and dried at 60° C. under reduced pressure. Thus, the polymer A was obtained.

Sodium iminodiacetate (54.8 g) was dissolved in 500 g of pure water, and into this solution was charged allyl glycidyl ether in such an amount as to achieve a molar ratio of 1:1 between allyl glycidyl ether and sodium iminodiacetate. The resulting mixture was heated at 70° C. for 1 hour with stirring, and subjected to reduced-pressure drying at 80° C., thereby preparing disodium iminodiacetate-incorporated allyl glycidyl ether (IDANa-AGE). Next, the thus prepared IDANa-AGE was dissolved in 200 g of pure-water/ethanol mixture (weight ratio between pure water and ethanol: 1:1), and thereinto was charged methyl methacrylate in such an amount as to achieve a molar ratio of 10:1 between methyl methacrylate and IDANa-AGE. Thereto, potassium persulfate was added so as to be 0.3 wt % based on the methyl methacrylate content, and those monomers were copolymerized by heating at 70° C. for 5 hours while bubbling with nitrogen gas. The thus obtained colloidal product was filtrated off, and dried at 60° C. under reduced pressure. Thus, the polymer B was obtained.

Sodium hydroxide (0.66 g) and iminodiacetic acid (1.33 g) were dissolved in a mixture of pure water (10 ml) and methanol (10 ml). Thereto, vinylbenzyl chloride (0.72 g) was added little by little over 30 minutes under heating at 60° C., and further therein sodium hydroxide (0.66 g) was dissolved. Thereto, vinylbenzyl chloride (0.72 g) was added again little by little over 30 minutes. Then, the volume of the resulting solution was reduced by half using an evaporator, and extraction of unreacted matters was conducted twice by the use of toluene in a separatory funnel. Thereafter, re-precipitation by pH adjustment was repeated twice. Thus, vinylbenzyliminodiacetic acid (VB-IDA) was obtained. To DMSO (36 g) having undergone bubbling with nitrogen, VB-IDA (1.0 g), methyl methacrylate (4.0 g) and azobisisobutyronitrile (0.072 g) were added (namely, methyl methacrylate was charged into DMSO in such an amount as to achieve a 10:1 molar ratio between methyl methacrylate and VB-IDA), and these monomers were subjected to polymerization for 6 hours at 70° C. After re-precipitation, cleaning was carried out, thereby obtaining the polymer C.

N-Methyl-D-glucamine (NMDG) (4.3 g (21.9 mmol)) was added to dioxane-pure water mixed solvent (volume ratio 1:2), and heated for 20 minutes to prepare a solution. To the solution, 4-vinylbenzyl chloride (3.2 ml (21.9 mmol)) dissolved in 10ml of dioxane was added little by little. Therein, reaction was carried out for 5 hours with stirring under reflux to obtain a yellow solution containing N-(4-vinylbenzyl)-N-methyl-D-glucamine (VB-NMDG). After removal of unreacted matters from the yellow solution by the use of ethyl ether, bubbling with nitrogen was carried out, methyl methacrylate (2.19 g (21.9 mmol)) and benzoyl peroxide (0.876 g (2 mol % with respect to the monomer)) were added (namely, methyl methacrylate was charged in such an amount as to achieve a 10:1 molar ratio between methyl methacrylate and VB-NMDG), and these monomers were subjected to polymerization for 4 hours at 75° C. After re-precipitation, cleaning was carried out, thereby obtaining the polymer D.

(8) Atom Count (%) of Atoms Derived from Chelating Functional Groups, Average value X and Standard Deviation Y Each of porous adsorption layers containing the iminodiacetic acid groups-containing polymer A, polymer B, and polymer C and chelating fiber (CHELEST FIBER (trade mark) IRY, manufactured by CHELEST CORPORATION), respectively, was immersed in a 0.1N aqueous solution of sodium hydroxide for one hour, taken out of the solution, and cleaned with distilled water until the pH value became neutral, thereby converting the iminodiacetic acid groups into sodium iminodiacetate groups.

The elemental analysis using the energy-dispersive X-ray analysis (X-ray accelerating voltage: 15kV) attached to a scanning electron microscope (SU1510, manufactured by Hitachi High-Technologies Corporation) was performed at 50 different spots in each porous adsorption layer under a magnification of 5,000 times, whereby the atom count (%) of Na or N atoms derived from the chelating functional groups was measured at each spot. And the average value X and the standard deviation Y of the atom counts measured were worked out.

Example 1

38 wt % of vinylidene fluoride homopolymer having a weight-average molecular weight of 417,000 and 62 wt % of γ-butyrolactone were mixed together and dissolved at a temperature of 170° C. This polymer solution was discharged from a spinneret while accompanying y-butyrolactione as a bore-forming liquid, and solidified in a cooling bath of a 10° C. aqueous solution containing 80 wt % of γ-butyrolactone, thereby forming a supporting layer in the form of a hollow-fiber membrane. The thus obtained supporting layer had a structure built up of accumulated spherical structural bodies having an average diameter of 3.0 μm, and the thickness of the supporting layer was 250 μm.

Next, 13 wt % of the polymer A having the chelating functional groups and 87 wt % of N-methyl-2-pyrrrolidone were mixed together and dissolved at a temperature of 95° C. to prepare a polymer solution. This polymer solution was applied uniformly to the surface of the supporting layer, and immediately solidified in a water bath, thereby preparing a hollow-fiber membrane in which a porous adsorption layer was formed on the supporting layer. The thus obtained porous adsorption layer had a three-dimensional network structure, and had an average pore diameter of 50 nm and a thickness of 50 μm.

Finally, 15 wt % of vinylidene fluoride homopolymer having a weight-average molecular weight of 284,000, 3 wt % of polyethylene glycol having a weight-average molecular weight of 20,000, 80 wt % of N-methyl-2-pyrrolidone and 2 wt % of water were mixed together and dissolved at temperature of 95° C. to prepare a polymer solution. This polymer solution was applied uniformly to the surface of the porous adsorption layer, and immediately solidified in a water bath, thereby preparing a hollow-fiber membrane in which a porous clarification layer was formed on the porous adsorption layer. The thus obtained porous clarification layer has a three-dimensional network structure and had an average pore diameter of 20 nm and a thickness of 50 μm.

The thus obtained hollow-fiber membrane had a pure-water permeability of 0.58 $m^3/m^2/hr$, a suspended-solid removal performance of 99%, an antifouling performance of 0.98, a copper removal performance of 95% and a rupture strength of 8.9 MPa, and it was found to be excellent in all of clarification performance, adsorption performance and mechanical strength. When determination of the atom count (%) of Na atoms as the atoms derived from the chelating functional groups was performed on the porous adsorption layer of the hollow-fiber membrane, it was found that the average value X was 1.48 and the standard deviation was 0.20, which indicated that the chelating functional groups were distributed uniformly throughout the porous adsorption layer. Additionally, the evaluation results obtained are summarized in Table 1.

Example 2

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1. The thus obtained porous adsorption layer had a three-dimensional network structure, and had an average pore diameter of 50 nm and a thickness of 50 μm.

Finally, 12 wt % of vinylidene fluoride homopolymer having a weight-average molecular weight of 284,000, 3 wt % of polyethylene glycol having a weight-average molecular weight of 20,000, 5 wt % of polyoxyethylene coconut oil fatty acid sorbitan (IONET T-20C, manufactured by Sanyo Chemical Industries, Ltd.), 77 wt % of N-methyl-2-pyrrolidone and 3 wt % of water were mixed together and dissolved at temperature of 95° C. to prepare a polymer solution. This polymer solution was applied uniformly to the surface of the porous adsorption layer, and immediately solidified in a water bath, thereby preparing a hollow-fiber membrane in which a porous clarification layer was formed on the porous adsorption layer. The thus obtained porous clarification layer had a three-dimensional network structure, and had an average pore diameter of 100 nm and a thickness of 50 μm.

The thus obtained hollow-fiber membrane had a pure-water permeability of 0.75 $m^3/m^2/hr$, a suspended-solid removal performance of 99%, an antifouling performance of 0.87, a copper removal performance of 89% and a rupture strength of 8.5 MPa, and it was found to be excellent in all of clarification performance, adsorption performance and mechanical strength, but somewhat inferior in antifouling performance to the hollow-fiber membrane obtained in Example 1. This is because the average pore diameter of the porous clarification layer was greater than that of the porous adsorption layer. When determination of the atom count (%) of Na atoms as the atoms derived from the chelating functional groups was performed on the porous adsorption layer of the hollow-fiber membrane, it was found that the average value X was 1.45 and the standard deviation was 0.19, which indicated that the chelating functional groups were distributed uniformly throughout the porous adsorption layer. Additionally, the evaluation results obtained are summarized in Table 1.

Example 3

A supporting layer in hollow-fiber membrane form was prepared in the same manner as in Example 1. The obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1. The thus obtained porous adsorption layer had a three-dimensional network structure, and had an average pore diameter of 50 nm and a thickness of 10 μm, and the thickness of the porous adsorption layer was smaller than that in Example 1.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.66 $m^3/m^2/hr$, a suspended-solid removal performance of 99%, an antifouling performance of 0.97, a copper removal performance of 70% and a rupture strength of 9.1 MPa, and it was found to be excellent in all of clarification performance, adsorption performance and mechanical strength, but somewhat inferior in copper removal performance to the hollow-fiber membrane obtained in Example 1. This is because the thickness of the porous adsorption layer was smaller than that in Example 1 to result in narrowing of the adsorption band. When determination of the atom count (%) of Na atoms as the atoms derived from the chelating functional groups was performed on the porous adsorption layer of the hollow-fiber membrane, it was found that the average value X was 1.43 and the standard deviation was 0.19, which indicated that the chelating functional groups were distributed uniformly throughout the porous adsorption layer. Additionally, the evaluation results obtained are summarized in Table 1.

Example 4

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1. The thus obtained porous adsorption layer had a three-dimensional network structure, and had an average pore diameter of 50 nm and a thickness of 200 μm, but the thickness of the porous adsorption layer was greater than that in Example 1.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.25 $m^3/m^2/hr$, a suspended-solid removal performance of 99%, an antifouling performance of 0.96, a copper removal performance of 99% and a rupture strength of 7.2 MPa, and it was found to be excellent in all of clarification performance, adsorption performance and mechanical strength, but somewhat inferior in pure-water permeability to the hollow-fiber membrane obtained in Example 1. This is because the thickness of the porous adsorption layer was greater than that in Example 1, and the filtration resistance became higher. When determination of the atom count (%) of Na atoms as the atoms derived from the chelating functional groups was performed on the porous adsorption layer of the hollow-fiber membrane, it was found that the average value X was 1.50 and the standard deviation was 0.21, which indicated that the chelating functional groups were distributed uniformly throughout the porous adsorption layer. Additionally, the evaluation results obtained are summarized in Table 1.

Example 5

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1 except for the use of the polymer B having chelating functional groups. The thus obtained porous adsorption layer had a three-dimensional network structure, and had an average pore diameter of 50 nm and a thickness of 50 μm.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.53 $m^3/m^2/hr$, a suspended-solid removal performance of 99%, an antifouling performance of 0.98, a copper removal performance of 95% and a rupture strength of 8.6 MPa, and it was found to be excellent in all of clarification performance, adsorption performance and mechanical strength. When determination of the atom count (%) of Na atoms as the atoms derived from the chelating functional groups was performed on the porous adsorption layer of the hollow-fiber membrane, it was found that the average value X was 1.53 and the standard deviation was 0.26, which indicated that the chelating functional groups were distributed uniformly throughout the porous adsorption layer. Additionally, the evaluation results obtained are summarized in Table 1.

Example 6

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1 except for the use of the polymer C having chelating functional groups. The thus obtained porous adsorption layer had a three-dimensional network structure, and had an average pore diameter of 60 nm and a thickness of 50 μm.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.64 $m^3/m^2/hr$, a suspended-solid removal performance of 99%, an antifouling performance of 0.97, a copper removal performance of 96% and a rupture strength of 9.2 MPa, and it was found to be excellent in all of clarification performance, adsorption performance and mechanical strength. When determination of the atom count (%) of Na atoms as the atoms derived from the chelating functional groups was performed on the porous adsorption layer of the hollow-fiber membrane, it was found that the average value X was 2.24 and the standard deviation was 0.38, which indicated that the chelating functional groups were distributed uniformly throughout the porous adsorption layer. Additionally, the evaluation results obtained are summarized in Table 1.

Example 7

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1 except for the use of the polymer D having chelating functional groups. The thus obtained porous adsorption layer had a three-dimensional network structure, and had an average pore diameter of 70 nm and a thickness of 50 μm.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.42 $m^3/m^2/hr$, a suspended-solid removal performance of 99%, an antifouling performance of 0.97, a boron removal performance of 71% and a rupture strength of 7.3 MPa, and it was found to be excellent in all of clarification performance, adsorption performance and mechanical strength. When determination of the atom count (%) of N atoms as the atoms derived from the chelating functional groups was performed on the porous adsorption layer of the hollow-fiber membrane, it was found that the average value X was 2.85 and the standard deviation was 1.55. Additionally, the evaluation results obtained are summarized in Table 1.

Example 8

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1. The thus obtained porous adsorption layer had a three-dimensional network structure, and had an average pore diameter of 200 nm and a thickness of 50 μm, but the pore diameter in the porous adsorption layer was greater than that in Example 1.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.68 $m^3/m^2/hr$, a suspended-solid removal performance of 99%, an antifouling performance of 0.96, a copper removal performance of 82% and a rupture strength of 8.1 MPa, and it was found to be excellent in all of clarification performance, adsorption performance and mechanical strength, but somewhat inferior in adsorption performance to the hollow-fiber membrane obtained in Example 1. This is because the pore diameter in the porous adsorption layer was greater than that in Example 1. When determination of the atom count (%) of Na atoms as the atoms derived from the chelating functional groups was performed on the porous adsorption layer of the hollow-fiber membrane, it was found that the average value X was 1.60 and the standard deviation was 0.61. Additionally, the evaluation results obtained are summarized in Table 1.

Example 9

A supporting layer in hollow-fiber membrane form was prepared in the same manner as in Example 1. The thus obtained supporting layer had a structure built up of accumulated spherical structural bodies having an average diameter of 3.0 μm, and the thickness of the supporting layer was 250 μm.

Next, a hollow-fiber membrane having a porous adsorption layer formed on the supporting layer was prepared in the same manner as in Example 1. The thus obtained porous adsorption layer had a three-dimensional network structure, and had an average pore diameter of 5 nm and a thickness of 50 μm, but the pore diameter in the porous adsorption layer was smaller than that in Example 1.

Finally, a hollow-fiber membrane having a porous clarification layer formed on the porous adsorption layer was prepared in the same manner as in Example 1. The thus obtained porous clarification layer had a three-dimensional network structure, and had an average pore diameter of 20 nm and a thickness of 50 μm.

The thus obtained hollow-fiber membrane had a pure-water permeability of 0.22 $m^3/m^2/hr$, a suspended-solid removal performance of 99%, an antifouling performance of 0.95, a copper removal performance of 99% and a rupture strength of 8.2 MPa, and it was found to be excellent in all of clarification performance, adsorption performance and mechanical strength, but somewhat inferior in pure-water permeability to the hollow-fiber membrane obtained in Example 1. This is because the pore diameter in the porous adsorption layer was smaller than that in Example 1. When determination of the atom count (%) of Na atoms as the atoms derived from the chelating functional groups was performed on the porous adsorption layer of the hollow-fiber membrane, it was found that the average value X was 1.52 and the standard deviation was 0.29, which indicated that the chelating functional groups were distributed uniformly throughout the porous adsorption layer. Additionally, the evaluation results obtained are summarized in Table 1.

Example 10

13 wt % of the polymer A having the chelating functional groups and 87 wt % of N-methyl-2-pyrrrolidone were mixed together and dissolved at a temperature of 95° C. to prepare a polymer solution for use in forming a porous adsorption layer.

In addition, 15 wt % of vinylidene fluoride homopolymer having a weight-average molecular weight of 284,000, 3 wt % of polyethylene glycol having a weight-average molecular weight of 20,000, 80 wt % of N-methyl-2-pyrrolidone and 2 wt % of water were mixed together and dissolved at temperature of 95° C. to prepare a polymer solution for use in forming a porous clarification layer.

A mixed solution containing 20 wt % of water and 80 wt % of N-methyl-2-pyrrolidone was prepared for use as an inside solidifying solution and a mixed solution containing 30 wt % of water and 70 wt % of N-methyl-2-pyrrolidone was prepared for use as an outside solidifying solution. While the inside solidifying solution was being discharged from the center pipe of a triple-pipe spinning nozzle, the polymer solution for use in forming a porous adsorption layer and the polymer solution for use in forming a porous clarification layer were spun out from the intermediate slit and the outer slit of the nozzle, respectively, into the outside solidifying solution, and the thus spun matter was drawn out at a speed of 10 m/min.

The drawn-out hollow-fiber membrane was cleaned with water to remove the solvent from the membrane.

The thus obtained porous adsorption layer had a three-dimensional network structure, and had an average pore diameter of 40 nm and a thickness of 150 μm, while the thus obtained porous clarification layer had a three-dimensional network structure, and had an average pore diameter of 20 nm and a thickness of 150 μm.

The thus obtained hollow-fiber membrane had a pure-water permeability of 0.13 $m^3/m^2/hr$, a suspended-solid removal performance of 99%, an antifouling performance of 0.98, a copper removal performance of 99% and a rupture strength of 2.1 MPa, and it was found to be excellent in both clarification performance and adsorption performance, but inferior in mechanical strength to the hollow-fiber membrane obtained in Example 1 because it had no supporting layer. When determination of the atom count (%) of Na atoms as the atoms derived from the chelating functional groups was performed on the porous adsorption layer of the hollow-fiber membrane, it was found that the average value X was 1.46 and the standard deviation was 0.43, which indicated that the chelating functional groups were distributed uniformly throughout the porous adsorption layer. Additionally, the evaluation results obtained are summarized in Table 1.

Comparative Example 1

A hollow-fiber membrane was prepared in the same manner as in Example 1, except that no porous adsorption layer was provided.

The thus obtained supporting layer had a structure built up of accumulated spherical structural bodies having an average diameter of 3.0 μm, and the thickness of the supporting layer was 250 μm.

On the other hand, the thus obtained porous clarification layer had a three-dimensional network structure, and had an average pore diameter of 20 nm and a thickness of 50 μm.

The thus obtained hollow-fiber membrane had a pure-water permeability of 1.8 $m^3/m^2/hr$, a suspended-solid removal performance of 99%, an antifouling performance of 0.98, a copper removal performance of 0% and a rupture strength of 8.8 MPa, and exhibited no adsorption performance because no porous adsorption layer was provided therein. Additionally, the evaluation results obtained are summarized in Table 2.

Comparative Example 2

A hollow-fiber membrane was prepared in the same manner as in Example 1, except that no porous clarification layer was provided.

The thus obtained supporting layer had a structure built up of accumulated spherical structural bodies having an average diameter of 3.0 and the thickness of the supporting layer was 250 μm.

On the other hand, the thus obtained porous adsorption layer had a three-dimensional network structure, and had an average pore diameter of 50 nm and a thickness of 50 μm.

The thus obtained hollow-fiber membrane had a pure-water permeability of 2.2 $m^3/m^2/hr$, a suspended-solid removal performance of 99%, an antifouling performance of 0.33, a copper removal performance of 88% and a rupture strength of 8.5 MPa, and it was found that the absence of a porous clarification layer caused fouling and markedly degraded antifouling performance; as a result, long-term stable operation was impossible. When determination of the atom count (%) of Na atoms as the atoms derived from the chelating functional groups was performed on the porous adsorption layer of the hollow-fiber membrane, it was found that the average value X was 1.47 and the standard deviation was 0.18, which indicated that the chelating functional groups were distributed uniformly throughout the porous adsorption layer. Additionally, the evaluation results obtained are summarized in Table 2.

Comparative Example 3

32 wt % of vinylidene fluoride homopolymer having a weight-average molecular weight of 417,000 and 68 wt % of γ-butyrolactone were mixed together and dissolved at a temperature of 170° C. To this polymer solution under stirring, iminodiacetic acid group-incorporated chelating fiber (CHELEST FIBER (trade mark) IRY, 30 to 40 μm in average diameter, manufactured by CHELEST CORPORATION) was further added in a proportion of 12 wt %, and mixed with stirring to prepare a dispersion. This dispersion was discharged from a spinneret while accompanying γ-butyrolactone as a bore-forming liquid, and solidified in a cooling bath of a 10° C. aqueous solution containing 80 wt % of γ-butyrolactone, thereby preparing a supporting layer in the form of a hollow-fiber membrane. The thus obtained supporting layer had a structure that chelating fibers were dispersed in spherical structural bodies having an average diameter of 3.0 μm, and the thickness of the supporting layer was 300 μm.

Next, 15 wt % of vinylidene fluoride homopolymer having a weight-average molecular weight of 284,000, 3 wt % of polyethylene glycol having a weight-average molecular weight of 20,000, 80 wt % of N-methyl-2-pyrrolidone and 2 wt % of water were mixed together and dissolved at temperature of 95° C. to prepare a polymer solution. This polymer solution was applied uniformly to the surface of the supporting layer, and immediately solidified in a water bath, thereby preparing a hollow-fiber membrane in which a porous clarification layer was formed on the supporting layer. The thus obtained porous clarification layer had a three-dimensional network structure, and had an average pore diameter of 20 nm and a thickness of 50 μm.

The thus obtained hollow-fiber membrane had a pure-water permeability of 1.1 $m^3/m^2/hr$, a suspended-solid removal performance of 99%, an antifouling performance of 0.98, a copper removal performance of 25% and a rupture strength of 8.5 MPa.

This hollow-fiber membrane was a composite separation membrane having a layer of three-dimensional network structure and a layer of adsorbent-containing porous structure, but the adsorbent was from 30 μm to 40 μm in diameter thereof and incomparably greater than metal ions targeted for separation, and the adsorbent was poor in chance of contact with metal ions. Therefore, the layer of adsorbent-containing porous structure was extremely bad in metal-ion adsorption efficiency. When determination of the atom count (%) of Na atoms as the atoms derived from the chelating functional groups was performed on the layer of adsorbent-containing porous structure in the hollow-fiber membrane, it was found that the average value X was 0.78 and the standard deviation was 0.95, which indicated that the chelating functional groups unevenly distributed. Additionally, the evaluation results obtained are summarized in Table 2.

Comparative Example 4

In the same manner as in Example 1, a supporting layer in hollow-fiber membrane form was prepared. The thus obtained supporting layer had a structure built up of accumulated spherical structural bodies having an average diameter of 3.0 μm, and the thickness of the supporting layer was 250 μm.

Next, a hollow-fiber membrane having a porous clarification layer formed on the supporting layer was prepared. The thus obtained porous clarification layer had a three-dimensional network structure, and had an average pore diameter of 20 nm and a thickness of 50 μm.

Finally, a hollow-fiber membrane having a porous adsorption layer formed on the porous clarification layer was prepared. The thus obtained porous adsorption layer had a three-dimensional network structure, and had an average pore diameter of 20 nm and a thickness of 50 μm.

The thus obtained hollow-fiber membrane had a pure-water permeability of 0.58 $m^3/m^2/hr$, a suspended-solid removal performance of 99%, an antifouling performance of 0.41, a copper removal performance of 90% and a rupture strength of 8.8 MPa, and it was found that, because the porous adsorption layer was placed nearer to the raw-water side than the porous clarification layer, suspended-matter fouling occurred in the porous adsorption layer to result in marked degradation in antifouling performance; as a result, long-term stable operation was impossible. When determination of the atom count (%) of Na atoms as the atoms derived from the chelating functional groups was performed on the porous adsorption layer of the hollow-fiber membrane, it was found that the average value X was 1.40 and the standard deviation was 0.17, which indicated that the chelating functional groups were distributed uniformly throughout the porous adsorption layer. Additionally, the evaluation results obtained are summarized in Table 2.

Comparative Example 5

A membrane was prepared in accordance with a known method in which glycidyl methacrylate was introduced onto the surface of a porous membrane and the inner surfaces of pores in the membrane by graft polymerization, and thereto chelating functional groups were introduced chemically. More specifically, 23 parts by weight of fine-grain silicate (Nipsil VN3LP), 56 parts by weight of dibutyl phthalate and 21 parts by weight of polyethylene resin powder (SH-800, manufactured by Asahi Kasei Corporation) were mixed together preliminarily, and extruded into the form of hollow fibers each having an inner diameter of 2 mm and an outer diameter of 3 mm by a twin-screw extruder, followed by immersing in trichloroethane for 90 minutes, whereby dibutyl phthalate was extracted. Further, the fine-grain silicate was extracted therefrom through the immersion in a 40 wt % aqueous solution of sodium hydroxide held at 60° C. for 20 minutes, and cleaning with water was carried out. Thus a porous polyethylene membrane was obtained. This porous polyethylene membrane was irradiated with 20 kGy of γ-rays, and subjected to graft polymerization through the immersion in a 10% glycidyl methacrylate/ethanol solution. Finally, the thus treated membrane was immersed in a 1:1 dimethyl sulfoxide-water mixture in which 10 wt % of sodium iminodiacetate was dissolved, then cleaned with water, thereby obtaining a hollow-fiber membrane having sodium iminodiacetate as chelating functional groups. The thus obtained hollow-fiber membrane had an average pore diameter of 220 nm and a thickness of 250 μm.

The thus obtained hollow-fiber membrane had a pure-water permeability of 2.2 $m^3/m^2/hr$, a suspended-solid removal performance of 82%, an antifouling performance of 0.65, a copper removal performance of 51% and a rupture strength of 7.5 MPa, and it was found that long-term stable operation became impossible because metal ion adsorption efficiency was low and fouling with suspended matter occurred. When determination of the atom count (%) of Na atoms as the atoms derived from the chelating functional groups was performed on the hollow-fiber membrane, it was found that the average value X was 2.65 and the standard deviation was 1.85, which indicated that the chelating functional groups unevenly distributed on the membrane surface and the internal surfaces of large pores. Additionally, the evaluation results obtained are summarized in Table 2.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Porous Clarification Layer | Polymer | PVDF | | | | | | | | | |
| | Average pore diameter (nm) | 20 | 100 | 20 | 20 | 20 | 20 | 20 | 20 | 20 | 20 |
| | Thickness (μm) | 50 | 50 | 50 | 50 | 50 | 50 | 50 | 50 | 50 | 150 |
| Porous Adsorption Layer | Polymer | A | A | A | A | B | C | D | A | A | A |
| | Average pore diameter (nm) | 50 | 50 | 50 | 50 | 50 | 60 | 70 | 200 | 5 | 40 |
| | Thickness (μm) | 50 | 50 | 10 | 200 | 50 | 50 | 50 | 50 | 50 | 150 |
| | Average value X on chelating functional groups | 1.48 | 1.45 | 1.43 | 1.50 | 1.53 | 2.24 | 2.85 | 1.60 | 1.52 | 1.46 |
| | Standard deviation Y on chelating functional groups | 0.20 | 0.19 | 0.19 | 0.21 | 0.26 | 0.38 | 1.55 | 0.61 | 0.29 | 0.43 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Supporting Layer | Presence/Absence |  |  |  |  | presence |  |  |  |  | absence |
| Clarification Performance | Permeability ($m^3/m^2/hr$) | 0.58 | 0.75 | 0.66 | 0.25 | 0.53 | 0.64 | 0.42 | 0.68 | 0.22 | 0.13 |
|  | Suspended-solid removal performance (%) | 99 | 99 | 99 | 99 | 99 | 99 | 99 | 99 | 99 | 99 |
|  | Antifouling performance | 0.98 | 0.87 | 0.97 | 0.96 | 0.98 | 0.97 | 0.97 | 0.96 | 0.95 | 0.98 |
| Adsorption Performance | Copper or boron removal performance (%) | 95 | 89 | 70 | 99 | 95 | 96 | 71 | 82 | 99 | 99 |
| Mechanical Strength | Rupture strength (MPa) | 8.9 | 8.5 | 9.1 | 7.2 | 8.6 | 9.2 | 7.3 | 8.1 | 8.2 | 2.1 |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Porous Clarification Layer | Polymer | PVDF | absence | PVDF | PVDF | absence |
|  | Average pore diameter (nm) | 20 | absence | 20 | 20 | absence |
|  | Thickness (μm) | 50 | absence | 50 | 50 | absence |
| Porous Adsorption Layer | Polymer | absence | A | absence | A | Sodium iminodiacetate was introduced into polyethylene after graft polymerization. |
|  | Average pore diameter (nm) | absence | 50 | absence | 50 | 220 |
|  | Thickness (μm) | absence | 50 | absence | 50 | 250 |
|  | Average value X on chelating functional groups | absence | 1.47 | absence | 1.40 | 2.65 |
|  | Standard deviation Y on chelating functional groups | absence | 0.18 | absence | 0.17 | 1.85 |
| Supporting Layer | Presence/absence | presence | presence | presence (containing adsorbent) | presence | absence |
|  | Average value X on chelating functional groups | — | — | 0.78 | — | — |
|  | Standard deviation Y on chelating functional groups | — | — | 0.95 | — | — |
| Clarification Performance | Permeability ($m^3/m^2/hr$) | 1.8 | 2.2 | 1.1 | 0.58 | 2.2 |
|  | Suspended-solid removal Performance (%) | 99 | 99 | 99 | 99 | 82 |
|  | Antifouling performance | 0.98 | 0.33 | 0.98 | 0.41 | 0.65 |
| Adsorption Performance | Copper removal performance (%) | 0 | 88 | 25 | 90 | 51 |
| Mechanical Strength | Rupture strength (MPa) | 8.8 | 8.5 | 8.5 | 8.8 | 7.5 |
|  | note | Porous adsorption layer was not provided. | Porous clarification layer was not provided. | Porous adsorption layer was not provided, but adsorbent was incorporated into supporting layer. | Porous adsorption layer was placed on raw water side. | Sodium iminodiacetate was introduced into porous polyethylene membrane after graft polymerization. |

While the present invention has been described in detail and by reference to the specified embodiments, it will be apparent to persons skilled in the art that various changes and modifications can be made without departing from the spirit and scope of the invention. The present application is based on Japanese Patent Application filed on Dec. 13, 2013 (Patent Application No. 2013-257756), the contents of which are incorporated herein by reference.

INDUSTRIAL APPLICABILITY

The present invention provides a multilayer separation membrane which includes a clarification layer and an adsorption layer and allows removal of suspended matter in water by the clarification layer and removal of metal ions in water by the adsorption layer. Accordingly, application of the multilayer separation membrane of the present invention to the field of water treatment makes it possible to sufficiently perform both removal of suspended solids in water and adsorptive removal of metal ions in water.

The invention claimed is:

1. A multilayer separation membrane which has a raw water side for introduction of raw water, wherein the separation membrane comprises:
    a porous adsorption layer comprising substantially a polymer having chelating functional groups which is distributed uniformly throughout; and
    a porous clarification layer disposed nearer to the raw water side than the porous adsorption layer;
    wherein
    when elemental analysis on cross sections of the porous adsorption layer is performed by an energy-dispersive X-ray analysis, an average value X of atom counts (%) of atoms derived from the chelating functional groups and a standard deviation Y thereof satisfy the relationship $X \geq 3Y$; and
    the separation membrane has a pure-water permeability of 0.10 $m^3/m^2/hr$ to 10 $m^3/m^2/hr$ under 50 kPa at 25° C., a rupture strength of 6 MPa or higher, and a rupture elongation of 10% or higher.

2. The multilayer separation membrane according to claim 1, wherein an average pore diameter A of pores in the porous adsorption layer and an average pore diameter B at a surface of the porous clarification layer satisfy a relation A>B.

3. The multilayer separation membrane according to claim 1, wherein the porous adsorption layer has a thickness of 10 μm to 500 μm.

4. The multilayer separation membrane according to claim 1, wherein the atoms derived from the chelating functional groups are at least one selected from the group consisting of N, O, P, S, Na and K.

5. The multilayer separation membrane according to claim 1, further comprising a supporting layer.

6. The multilayer separation membrane according to claim 1, wherein the porous adsorption layer is a layer obtained in accordance with a thermally-induced phase separation method and/or a nonsolvent-induced phase separation method.

7. The multilayer separation membrane according to claim 1, wherein the porous clarification layer is a layer obtained in accordance with a thermally-induced phase separation method and/or a nonsolvent-induced phase separation method.

\* \* \* \* \*